United States Patent
Kim et al.

(10) Patent No.: US 9,072,003 B2
(45) Date of Patent: Jun. 30, 2015

(54) METHOD AND APPARATUS FOR REPORTING ABNORMAL POWER OUTAGE IN WIRELESS ACCESS SYSTEM SUPPORTING M2M ENVIRONMENTS

(75) Inventors: Jeongki Kim, Anyang-si (KR); Heejeong Cho, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 14/128,441

(22) PCT Filed: Jun. 20, 2012

(86) PCT No.: PCT/KR2012/004860
§ 371 (c)(1),
(2), (4) Date: Jan. 29, 2014

(87) PCT Pub. No.: WO2012/177038
PCT Pub. Date: Dec. 27, 2012

(65) Prior Publication Data
US 2014/0293967 A1    Oct. 2, 2014

Related U.S. Application Data

(60) Provisional application No. 61/498,617, filed on Jun. 20, 2011, provisional application No. 61/554,984, filed on Nov. 3, 2011.

(30) Foreign Application Priority Data

Mar. 30, 2012 (KR) .................. 10-2012-0033210

(51) Int. Cl.
*H04W 24/10* (2009.01)
*H04L 5/00* (2006.01)

(52) U.S. Cl.
CPC ............. *H04W 24/10* (2013.01); *H04L 5/0055* (2013.01)

(58) Field of Classification Search
USPC ......................................................... 370/335
See application file for complete search history.

(56) References Cited

U.S. PATENT DOCUMENTS

2010/0008218 A1* 1/2010 Dumov et al. ............... 370/216
2012/0146799 A1* 6/2012 Bell et al. ..................... 340/635
2012/0226930 A1* 9/2012 Colban et al. ................ 713/340

FOREIGN PATENT DOCUMENTS

WO    2010/101447    9/2010

OTHER PUBLICATIONS

Wei, et al., "Abnormal Outage Report in 802.16p", IEEE 802.16 Broadband Wireless Access Working Group, IEEE C802.16p-10/0032, Dec. 2010, 10 pages.

(Continued)

*Primary Examiner* — Thai Nguyen
(74) *Attorney, Agent, or Firm* — Lee, Hong, Degerman, Kang & Waimey (57) ABSTRACT

A method and apparatus for transmitting and receiving a power outage report message of M2M device is disclosed. A method for reporting an abnormal power outage event in a wireless access system that supports M2M environment comprises the steps of detecting the abnormal power outage even in an M2M device of a connected state in a normal mode; and transmitting a signaling header from the M2M device to a base station, the signaling header including a power outage indicator for reporting the abnormal power outage event.

10 Claims, 5 Drawing Sheets

(56) References Cited

OTHER PUBLICATIONS

Chen, et al., "Handling Smart Meter Power Outage", IEEE 802.16 Broadband Wireless Access Working Group, IEEE C802.16p-11/0011r1, Mar. 2011, 3 pages.

Golla, et al., "Amendment text supporting involuntary power down reporting for smart metering applications", IEEE 802.16 Broadband Wireless Access Working Group, IEEE C802.16p-11/0015, Mar. 2011, 4 pages.

Wei, et al., "Abnormal Outage Report in M2M Communication", IEEE 802.16 Broadband Wireless Access Working Group, IEEE C802.16p-11/0050, Mar. 2011, 8 pages.

PCT International Application No. PCT/KR2012/004860, Written Opinion of the International Searching Authority dated Dec. 20, 2012, 10 pages.

Golla, et al., "Amendment text supporting involuntary power down reporting for smart metering applications," IEEE 802.16 Broadband Wireless Access Working Group, IEEE C802.16p-10/0033, Dec. 2010, 4 pages.

European Patent Office Application Serial No. 12802466.8, Search Report dated Jan. 20, 2015, 8 pages.

\* cited by examiner

*APDI : Abnormal Power Down Indicator

METHOD AND APPARATUS FOR REPORTING ABNORMAL POWER OUTAGE IN WIRELESS ACCESS SYSTEM SUPPORTING M2M ENVIRONMENTS

CROSS-REFERENCE TO RELATED APPLICATIONS

This application is the National Stage filing under 35 U.S.C. 371 of International Application No. PCT/KR2012/004860, filed on Jun. 20, 2012, which claims the benefit of earlier filing date and right of priority to Korean Application No. 10-2012-0033210, filed on Mar. 30, 2012, and also claims the benefit of U.S. Provisional Application Ser. Nos. 61/498,617, filed on Jun. 20, 2011, and 61/554,984, filed on Nov. 3, 2011, the contents of which are all hereby incorporated by reference herein in their entirety.

TECHNICAL FIELD

The present invention relates to a wireless communication system, and more particularly, to a method and apparatus for transmitting and receiving a report message for an abnormal power outrage event of a M2M device in a wireless communication system.

BACKGROUND ART

Hereinafter, a machine to machine (M2M) communication environment will be described in brief.

Machine-to-Machine (M2M) refers to communication between an electronic device and another electronic device. In a broad sense, M2M refers to wire or wireless communication between electronic devices or communication between a machine and a device controlled by a person. However, it is general that M2M recently refers to wireless communication between electronic devices, i.e., devices performed without control of a person.

In the early 1990s when M2M communication has been introduced, M2M communication has been recognized as remote control or telematics and M2M communication markets have been very restrictive. However, M2M communication markets have received attention all over the world since M2M communication had been able to grow rapidly for last several years. Particularly, M2M communication has exerted its great influence at point of sales (POS) and security related application markets in the fields of fleet management, remote monitoring of machine and facilities, measurement of working time on construction machine facilities, and smart meter automatically measuring heat or the use of electricity. It is expected that M2M communication will be used for various purpose of uses in association with the existing mobile communication and low power communication solutions such as wireless high-speed Internet, Wi-Fi, and Zigbee and that its coverage will be extended to business to consumer (B2C) markets without limitation to business to business (B2B) markets.

In the M2M communication age, since all machines provided with a subscriber identity module (SIM) card may be able to perform data transmission and reception, they may remotely be controlled. For example, M2M communication technologies may be used for many machines and equipments such as cars, trucks, trains, containers, vending machines, and gas tanks. In this way, application ranges of M2M communication technologies are very broad.

According to the related art, since it was general that a user equipment was controlled separately, communication between a base station and a user equipment has been performed by a one-to-one communication mode. Supposing that many M2M devices perform communication with a base station through such a one-to-one communication mode, network overload will be caused by signaling generated between each of the M2M devices and the base station. As described above, if M2M communication is rapidly spread and widely used, a problem may occur due to overhead caused by communication between M2M devices or between each of the M2M devices and the base station.

Also, since a person does not involve in operations of the M2M devices in the M2M system, an abnormal power outage event for the M2M devices may occur. In this case, a power outage event may occur in most of M2M devices at a point to which the corresponding M2M device belongs.

If a power outage event occurs, the M2M devices should report such a power outage event to the base station. For example, M2M devices in an idle mode may perform a ranging process to report the power outage event. In this case, it is likely that collision between the M2M devices may occur.

If collision between the M2M devices occurs, a collision resolution process is performed to solve the collision. Accordingly, if an abnormal power outage event occurs, problems may occur in that unnecessary power consumption is increased in the M2M device and efficiency of a system resource may be deteriorated.

DISCLOSURE OF INVENTION

Technical Problem

An object of the present invention devised to solve the conventional problem is to provide an efficient communication method for M2M device.

Another object of the present invention is to provide a method for reporting power outage to minimize the probability of collision between M2M devices under an abnormal power outage event.

Other object of the present invention is to provide a method for reporting a power down event or abnormal power outage event of M2M devices in connected state, to a base station as soon as the power down event or abnormal power outage event occurs.

It will be appreciated by persons skilled in the art that the objects that could be achieved with the present invention are not limited to what has been particularly described hereinabove and the above and other objects that the present invention could achieve will be more clearly understood from the following detailed description.

Solution to Problem

To solve the aforementioned technical problems, methods and apparatuses for transmitting and receiving a power outage report message of M2M device will be disclosed hereinafter.

According to one aspect of the present invention, a method for reporting an abnormal power outage event in a wireless access system that supports M2M environment comprises the steps of detecting the abnormal power outage event in an M2M device in a connected state; and transmitting a signaling header from the M2M device to a base station, the signaling header including a power outage indicator for reporting the abnormal power outage event.

Also, the method may further comprise the steps of transmitting a bandwidth request preamble sequence requesting a bandwidth for transmitting the signaling header; and receiving a CDMA allocation indicator in response to the bandwidth request preamble sequence, the CDMA allocation indicator including resource allocation information on the bandwidth, wherein the signaling header is transmitted through the bandwidth indicated by the resource allocation information. In this case, the power outage indicator may be an emergency type field of 1 bit.

Also, the method may further comprise the steps of receiving a response message in response to the signaling header, the response message indicating that a power down operation should be performed; and performing the power down operation after receiving the response message. In this case, the signaling header may be an M2M abnormal power down report header.

In another aspect of the present invention, a method for reporting an abnormal power outage event in a wireless access system that supports M2M environment comprises the steps of receiving a signaling header from an M2M device, the signaling header including a power outage indicator for reporting the abnormal power outage event; and transmitting a response message in response to the signaling header, the response message indicating that a power down operation should be performed.

Also, the method may further comprise the steps of receiving a bandwidth request preamble sequence for requesting a bandwidth for transmitting the signaling header; and transmitting a CDMA allocation indicator in response to the bandwidth request preamble sequence, the CDMA allocation indicator including resource allocation information on the bandwidth, wherein the signaling header is transmitted received through the bandwidth indicated by the resource allocation information. In this case, the power outage indicator may be an emergency type field of 1 bit.

Also, the response message may be an acknowledgement (ACK) message or M2M abnormal power down confirmation header.

Also, the signaling header may be an M2M abnormal power down report header.

In other aspect of the present invention, an M2M device for reporting an abnormal power outage event in a wireless access system that supports M2M environment comprises a transmitter; a receiver; and a processor controlling sensing and reporting operations of the abnormal power outage event.

At this time, the M2M device detects the abnormal power outage event in a connected state through the processor, and transmits a signaling header to a base station through the transmitter, the signaling header including a power outage indicator for reporting the abnormal power outage event.

Also, the M2M device may transmit a bandwidth request preamble sequence for requesting a bandwidth for transmitting the signaling header, and may receive a CDMA allocation indicator in response to the bandwidth request preamble sequence through the receiver, the CDMA allocation indicator including resource allocation information on the bandwidth. At this time, the signaling header may be transmitted through the bandwidth indicated by the resource allocation information.

At this time, the power outage indicator may be an emergency type field of 1 bit.

Also, the M2M device may receive a response message in response to the signaling header through the receiver, the response message indicating that a power down operation should be performed, and the processor may perform the power down operation after receiving the response message.

At this time, the signaling header may be an M2M abnormal power down report header.

The aspects of the present invention are only a part of the preferred embodiments of the present invention, and various embodiments based on technical features of the present invention may be devised and understood by the person with ordinary skill in the art based on the detailed description of the present invention.

Advantageous Effects of Invention

According to the embodiments of the present invention, the following advantages may be obtained.

First of all, an efficient communication method for M2M devices is provided.

Second, M2M devices may report a power down event or abnormal power outage event to a base station as soon as the power down event or abnormal power outage event occurs.

Third, M2M device in a normal state may report an abnormal power outage event to the base station by transmitting a signaling header without performing an idle mode entry process and a ranging process.

It will be appreciated by persons skilled in the art that that the effects that could be achieved with the present invention are not limited to what has been particularly described hereinabove and other advantages of the present invention will be more clearly understood from the following detailed description. In other words, the effects that are not intended by the present invention may be devised from the embodiments of the present invention by persons skilled in the art.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

The embodiments of the present invention provide methods and apparatuses for transmitting and receiving a report message for an abnormal power outrage event.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

In this specification, the embodiments of the present invention have been described based on data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the base station (BS) may be replaced with terms such as a fixed station, Node B, eNode B (eNB), an advanced base station (ABS), and an access point (AP).

Also, the mobile station may be replaced with terms such as a user equipment (UE), a subscriber station (SS), a mobile subscriber station (MSS), a mobile terminal (MT), an advanced mobile station (AMS), or a terminal. In particular, in the present invention, the mobile station may be used to refer the same meaning as M2M device.

Furthermore, a transmitting side means a fixed and/or mobile node that transmits data services or voice services while a receiving side means a fixed and/or mobile node that receives data services or voice services. Accordingly, in an uplink, the mobile station could be the transmitting side while the base station could be the receiving side. Likewise, in a downlink, the mobile station could be the receiving side while the base station could be the transmitting side.

The embodiments of the present invention may be supported by standard documents disclosed in at least one of wireless access systems, i.e., IEEE 802.xx system, 3GPP system, 3GPP LTE system, and 3GPP2 system. Namely, apparent steps or parts, which are not described in the embodiments of the present invention, may be supported by the above documents.

Also, all terminologies disclosed herein may be described by the above standard documents. Particularly, the embodiments of the present invention may be supported by one or more of standard documents of IEEE 802.16 system, i.e., P802.16e-2004, P802.16e-2005, P802.16m, P802.16p and P802.16.1b.

Hereinafter, reference will now be made in detail to the preferred embodiments of the present invention, examples of which are illustrated in the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The following description will be made so that a person with an ordinary skill in the art to which the present invention pertains can easily carry out the embodiments of the present invention. However, it is to be understood that various modifications may be made in the present invention and the present invention is not limited to the following description. In order to clarify the present invention, parts which are not related with the description will be omitted from the drawings, and wherever possible, the same reference numbers will be used throughout the drawings to refer to the same or like parts.

In this specification, when some part "includes" some elements, it means that the part may further include other elements unless mentioned to the contrary. Also, terminologies " . . . part," " . . . block," and " . . . module" mentioned in this specification mean a unit processing at least one function or operation, and may be implemented by hardware, software or combination of hardware and software.

Also, specific terminologies hereinafter used in the embodiments of the present invention are provided to assist understanding of the present invention, and various modifications may be made in the specific terminologies within the range that they do not depart from technical spirits of the present invention.

1. M2M Device

Hereinafter, communication between M2M devices means information exchange performed between user equipments through a base station, or between a base station and user equipments without control of a user. Accordingly, the M2M device means a user equipment that can support communication of the M2M device.

An access service network for M2M service will be defined as an M2M access service network (ASN), and a network entity that performs communication with M2M devices will be referred to as M2M server. The M2M server performs M2M application, and provides M2M specific service for one or more M2M devices. M2M feature is a feature of M2M application, and one or more features may be required to provide application. M2M device group means a group of M2M devices that share one or more features.

Devices (that may be referred to as various terms such as M2M device, M2M communication device, and machine type communication (MTC) device) that perform communication in M2M mode will be increased gradually in a certain network as their device application types are increased.

Examples of device application types include (1) security, (2) public safety, (3) tracking and tracing, (4) payment, (5) healthcare, (6) remote maintenance and control, (7) metering, (8) consumer device, (9) fleet management at POS (Point Of Sales) and security related application market, (10) communication between devices of vending machine, (11) remote controlling of machine and facilities, measurement of working time on construction machine facilities, and smart meter automatically measuring heat or the use of electricity, and (12) surveillance video communication of a surveillance camera. However, the device application types are not limited to the above examples, and the other various device application types may be used.

Another feature of the M2M device is low mobility or no mobility once the M2M device is installed. Low mobility or no mobility means that the M2M device is stationary for a long time. The M2M communication system may simplify or optimize mobility-associated operations for a specific M2M application having a fixed location such as secured access and surveillance, public safety, payment, remote maintenance and control, and metering.

As described above, as the device application types are increased, the number of M2M communication devices may be increased more rapidly than the number of general mobile communication devices. Accordingly, if the communication devices respectively perform communication with a base station, serious load may be caused in a wireless interface and network.

Hereinafter, the embodiment of the present invention will be described based on M2M communication applied to a wireless communication system (for example, P802.16e, P802.16m, P802.16.1b, P802.16p, etc.). However, M2M communication of the present invention is not limited to the above wireless communication, and may be applied to other communication systems such as 3GPP LTE/LTE-A system.

Figure 1:
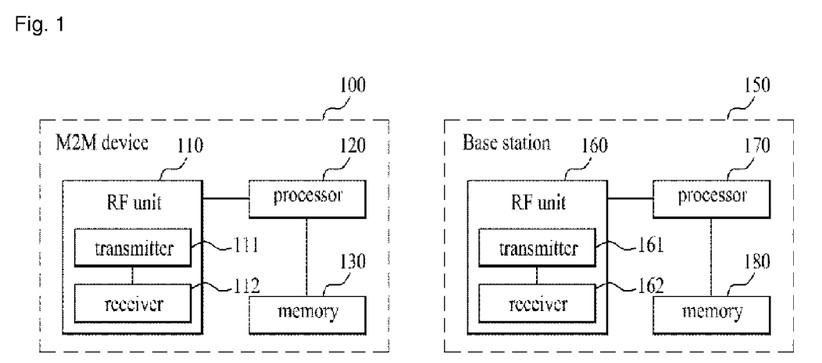
FIG. 1 is a brief diagram illustrating configurations of an M2M device and a base station according to one embodiment of the present invention.

FIG. 1 is a brief diagram illustrating configurations of an M2M device and a base station according to the embodiment of the present invention.

In FIG. 1, each of an M2M device 100 and a base station 150 may include a radio frequency (RF) unit 110, 160, and a processor 120, 170. Each of the M2M device and the base station may selectively include a memory 130, 180. Although one M2M device and one base station are shown in FIG. 1, M2M communication environments may be constructed among a plurality of M2M devices and a plurality of base stations.

Each RF unit 110, 160 may include a transmitter 111, 161 and a receiver 112, 162. In case of the M2M device 100, the transmitter 111 and the receiver 112 may be configured to transmit and receive a signal to and from the base station 150 and other M2M devices, and the processor 120 may be functionally connected with the transmitter 111 and the receiver 112 to control the signal transmission and reception procedure of the transmitter 111 and the receiver 112 to and from other devices. Also, the processor 120 performs various kinds of processing for a signal for transmission and then transmits the processed signal to the transmitter 111, and may perform processing for the signal received by the receiver 112.

The processor 120 may store information included in the exchanged message in the memory 130 if necessary. The M2M device 100 configured as above may perform methods of various embodiments which will be described later.

In the mean time, although not shown in FIG. 1, the M2M device 100 may include various additional elements in accordance with its device application type. If the corresponding M2M device 100 is for smart metering, it may include additional element for power measurement. An operation for power measurement may be controlled by the processor 120 shown in FIG. 1, or may be controlled by a separate processor (not shown).

Although FIG. 1 illustrates an example of communication performed between the M2M device 100 and the base station 150, a method for M2M communication according to the present invention may be performed between the M2M devices, each of which may perform the method according to various embodiments, which will be described later, in the same manner as each device shown in FIG. 1.

In case of the base station 150, the transmitter 161 and the receiver 162 may be configured to transmit and receive a signal to and from another base station, M2M server and M2M devices, and the processor 170 may be functionally connected with the transmitter 161 and the receiver 162 to control the signal transmission and reception procedure of the transmitter 161 and the receiver 162 to and from other devices. Also, the processor 170 performs various kinds of processing for a signal for transmission and then transmits the processed signal to the transmitter 161, and may perform processing for the signal received by the receiver 162. The processor 170 may store information included in the exchanged message in the memory 180 if necessary. The base station 150 configured as above may perform methods of various embodiments which will be described later.

Each processor 120, 170 of the M2M device 110 and the base station 150 indicates (for example, controls, coordinates or manages) the operation of each of the M2M device 110 and the base station 150. Each processor 120, 170 may be connected with the memory 130, 180 that stores program codes and data therein. The memory 130, 180 is connected with the processor 120, 170 and stores an operating system, an application, and general files therein.

The processor 120, 170 may be referred to as a controller, a microcontroller, a microprocessor, or a microcomputer. In the mean time, the processor 120, 170 may be implemented by hardware, firmware, software, or their combination. If the embodiments of the present invention are implemented by hardware, the processor 120, 170 may include application specific integrated circuits (ASICs), digital signal processors (DSPs), digital signal processing devices (DSPDs), programmable logic devices (PLDs), and field programmable gate arrays (FPGAs).

In the mean time, if the embodiments of the present invention are implemented by firmware or software, the firmware or software may be configured to include a module, a procedure, or a function, which performs functions or operations of the present invention. The firmware or software may be provided in the processor 120, 170 or may be stored in the memory 130, 180 and then may be driven by the processor 120, 170.

Figure 2:
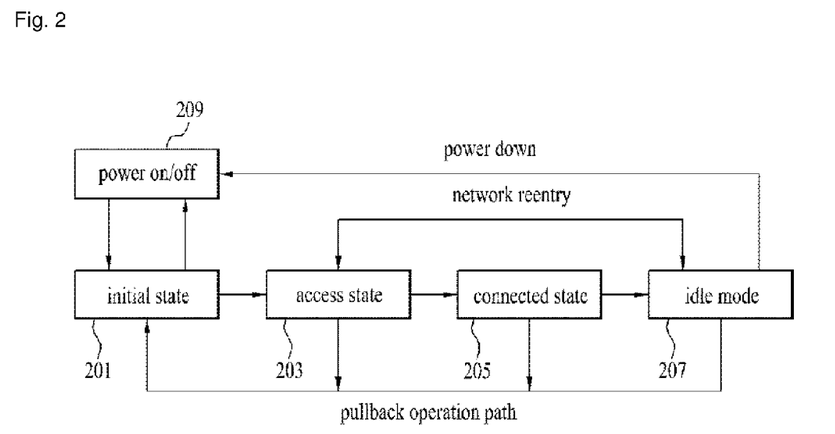
FIG. 2 is a diagram illustrating an example of a state shift process of an M2M device used in the present invention.

FIG. 2 is a diagram illustrating an example of a state shift process of an M2M device used in the present invention.

If the M2M device is powered on, it enters an initial state (201). Afterwards, the M2M device performs an initial network entry process at an access state (203) and enters a connected state (205). The M2M device transmits and receives data to and from the base station at the connected state, and enters an idle mode (207) if there are no data for transmission and reception. Also, the M2M device enters a power off state (209) after power down state at the idle mode. In other words, power down occurs in the M2M device at the idle mode, the M2M device enters the power off state by performing a location update process for power down.

Also, if a power down event (for example, power outage event) occurs even though the M2M device transmits and receives data at the connected state, the M2M device may perform location update by entering the idle mode and enter the power off state.

2. Power Down Process

Figure 3:
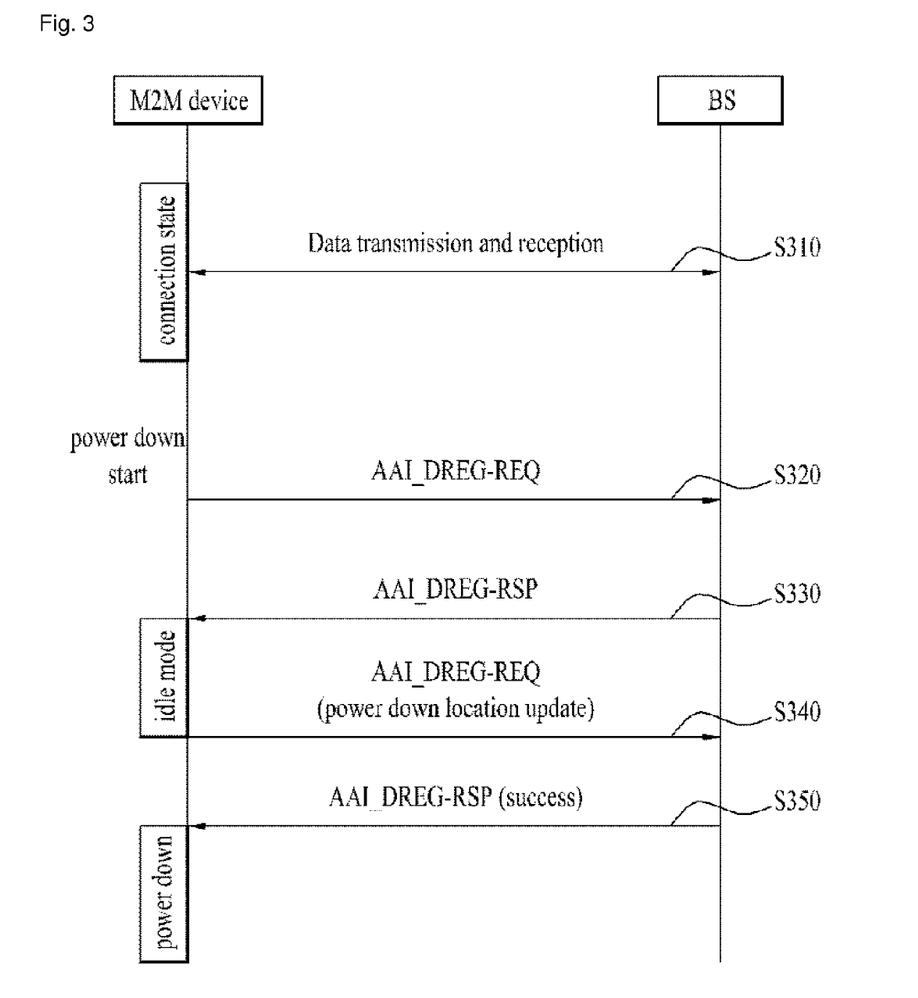
FIG. 3 is a diagram illustrating one of methods for performing power down in an M2M device according to the present invention.

FIG. 3 is a diagram illustrating one of methods for performing power down in an

M2M device according to the present invention.

The M2M device transmits and receives data to and from the base station at a normal mode, that is, the connected state (S310).

If a power down event occurs in the M2M device, the M2M device transmits a deregistration request (AAI-DREG-REQ) message to the base station to enter a power off state (S320).

The base station that has received the deregistration request message transmits a deregistration response (AAI-DREG-RSP) message in response to the deregistration request message and grants idle mode entry of the M2M device (S330).

The M2M device that has received the deregistration response message enters the idle mode, and performs location update to enter the power off state. In other words, the M2M device transmits a ranging request (AAI-RNG-REQ) message to the base station, wherein the ranging request message includes an indicator indicating power down location update (S340).

The base station transmits a ranging response message to the M2M device in response to the ranging request message, wherein the ranging response message indicates ranging success (S350).

The M2M device that has received the ranging response message enters the power down state.

As illustrated in FIG. 3, the M2M device performs the power down process at the connected state through the deregistration process (S320 and S330) and the power down location update process.

However, the operation of FIG. 3 is disadvantageous in that an unnecessary process for the M2M device or the base station is performed. Also, the M2M device may delay its power outage report process if an unexpected power outage event occurs.

3. Method for Reporting Abnormal Power Outage

Hereinafter, the methods for performing abnormal power outage report in accordance with the embodiments of the present invention will be described in detail.

Figure 4:
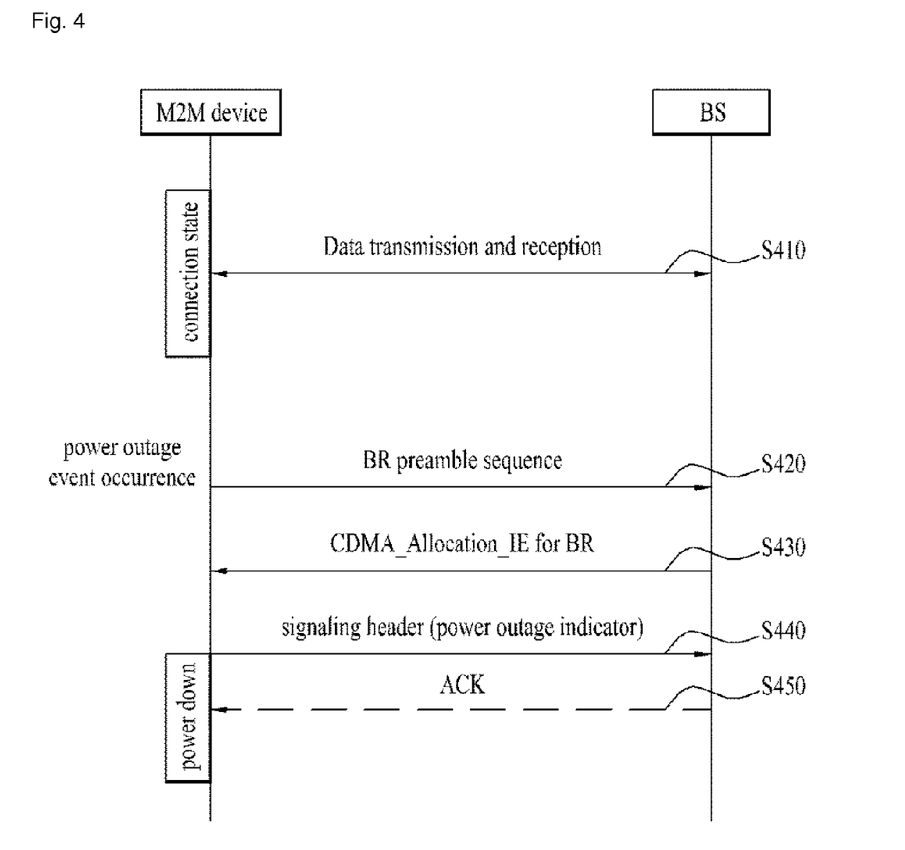
FIG. 4 is a diagram illustrating one of methods for reporting an abnormal power outage event in accordance with the present invention.

FIG. 4 is a diagram illustrating one of methods for reporting an abnormal power outage event in accordance with the present invention.

In the embodiments of the present invention, the M2M device may report an abnormal power outage event to the base station by transmitting a signaling header at the connected state. Although one M2M device is shown in FIG. 4 for convenience of description, two or more M2M devices may perform communication with the base station.

Referring to FIG. 4, the M2M device and the base station may transmit and receive data to and from each other at the connected state (S410).

At this time, it is assumed that an abnormal power outage event occurs suddenly in the M2M device. In this case, the M2M device transmits a bandwidth request (BR) preamble sequence to the base station to request a bandwidth for transmitting the signaling header (S420).

The base station that has received the BR preamble sequence allocates a radio resource to the corresponding M2M device. Afterwards, the base station may transmit a code division multiple access (CDMA) allocation information element (IE) to the M2M device, wherein the CDMA allocation IE includes resource allocation information on the allocated radio resource (S430).

The M2M device that has received the CDMA allocation IE may transmit a signaling header to the base station, wherein the signaling header includes a power outage indicator indicating a power outage event (S440).

The base station that has received the signaling header including the power outage indicator may transmit a response message to the M2M device in response to the signaling header. At this time, ACK message may be used as the response message. Alternatively, the base station may command the M2M Device to perform the power down operation by transmitting M2M abnormal power down confirmation header to the M2M device as the response message (S450).

The M2M device may perform the power down operation as soon as it transmits the signaling header including the power outage indicator at the step S440, or may perform the power down operation after receiving the ACK message at the step S450. When the M2M device receives the response message commanding the power down operation, the M2M device should perform the power down operation.

The following Table 1 illustrates an example of a signaling header format that may be used at the step S440.

TABLE 1

| Syntax | Size | Contents |
| --- | --- | --- |
| AMS Battery Report header( ){ | | |
| FID | 4 | Flow Identifier. This field indicates MAC signaling header. Set to 0b0010 |
| Type | 5 | MAC signaling header type = 0b00100 |
| Length | 3 | Indicates the length of the signaling header in |
| AMS Battery Status | 1 | 0b0: The AMS is plugged into a power source0b1: The AMS is not plugged into a power sourcebytes. |
| Battery Level Indication | 1 | 0b0: Detailed battery level report is not included. 0b1: Detailed battery level report is included. |
| Involuntary power outage indication | 1 | 0: Indicates that the involuntary power outage happens1: reserved |
| If(Battery Level Indication ==1){ | | |
| AMS battery Level | 3 | 0b000: Battery level is >75% and <=100% 0b001: Battery level is >50% and <=75% 0b010: Battery level is >25% and <=50% 0b011: Battery level is >5% and <=25% 0b100: Battery level is below 5% 0b101-0b111: Reserved |
| Reserved }else{ | 6 | Shall be filled by 0 |
| Reserved } } | 1 | Shall be filled by 0 |

Referring to Table 1, the signaling header may include a flow identifier (FID) field set to 0b0010, a type field indicating a type of MAC signaling header, a length field indicating a length of the corresponding signaling header, an AMS battery status field indicating whether the M2M device has been connected to a power source, a battery level indication field indicating whether a detailed battery level is included, and an involuntary power outage indication field indicating that an abnormal power outage event has occurred. At this time, if the battery level indication field is set to '1', the signaling header may further include an AMS battery level field indicating a detailed numerical value range of a power level of the M2M device.

The following Table 2 illustrates another example of a signaling header format that may be used at the step S440.

TABLE 2

| Syntax | Size | Contents |
|---|---|---|
| AMS Battery Report header ( ) { | | |
| FID | 4 | Flow Identifier. This field indicates MAC signaling header. Set to 0b0010 |
| Type | 5 | MAC signaling header type = 0b00100 |
| Length | 3 | Indicates the length of the signaling header in bytes. |
| AMS Battery Status | 1 | 0b0: The AMS is plugged into a power source 0b1: The AMS is not plugged into a power source |
| Battery Level Indication | 1 | 0b0: Detailed battery level report is not included. 0b1: Detailed battery level report is included. |
| If (Battery Level Indication == 1) { | | |
| AMS Battery Level | 3 | 0b000: Battery level is >75% and <=100%<br>0b001: Battery level is >50% and <=75%<br>0b010: Battery level is >25% and <=50%<br>0b011: Battery level is >5% and <=25%<br>0b100: Battery level is below 5%<br>0b101-0b111: Reserved |
| Involuntary power outage indication | 1 | 0: Indicates that the involuntary power outage happens 1: reserved |
| Reserved | 6 | Shall be filled by 0 |
| } else { | | |
| Involuntary power outage indication | 1 | 1: Indicates that the involuntary power outage happens |
| Reserved | 1 | Shall be filled by 0 |
| } | | |
| } | | |

Referring to Table 2, the signaling header may include a flow identifier (FID) field set to 0b0010, a type field indicating a type of MAC signaling header, a length field indicating a length of the corresponding signaling header, an AMS battery status field indicating whether the M2M device has been connected to a power source, a battery level indication field indicating whether a detailed battery level is included, and an involuntary power outage indication field indicating that an abnormal power outage event has occurred. At this time, if the battery level indication field is set to '1', the signaling header may further include an AMS battery level field indicating a detailed numerical value range of a power level of the M2M device and an involuntary power outage indication field indicating that the abnormal power outage event has occurred.

The following Table 3 illustrates still another example of a signaling header format that may be used at the step S440.

TABLE 3

| Syntax | Size | Contents |
|---|---|---|
| AMS Battery Report header ( ) { | | |
| FID | 4 | Flow Identifier. This field indicates MAC signaling header. Set to 0b0010 |
| Type | 5 | MAC signaling header type = 0b00100 |
| Length | 3 | Indicates the length of the signaling header in bytes. |
| AMS Battery Status | 1 | 0b0: The AMS is plugged into a power source 0b1: The AMS is not plugged into a power source |
| Battery Level Indication | 1 | 0b0: Detailed battery level report is not included. 0b1: Detailed battery level report is included. |
| If (Battery Level Indication == 1) { | | |
| AMS Battery Level | 3 | 0b000: Battery level is >75% and <=100%<br>0b001: Battery level is >50% and <=75%<br>0b010: Battery level is >25% and <=50%<br>0b011: Battery level is >5% and <=25%<br>0b100: Battery level is below 5%<br>0b101-0b111: Reserved |
| Reserved | 7 | Shall be filled by 0 |
| } else { | | |
| Reserved | 2 | Shall be filled by 0 |
| } | | |
| } | | |

Referring to Table 3, the signaling header may include a flow identifier (FID) field set to 0b0010, a type field indicating a type of MAC signaling header, a length field indicating a length of the corresponding signaling header, an AMS battery status field indicating whether the M2M device has been connected to a power source, a battery level indication field indicating whether a detailed battery level is included, and an involuntary power outage indication field indicating that an abnormal power outage event has occurred. At this time, if the battery level indication field is set to '1', the signaling header may further include an AMS battery level field indicating a detailed numerical value range of a power level of the M2M device. At this time, if the AMS battery level field is set to 0b101, it may not indicate the detailed numerical value range of the power level of the M2M device but indicate that an abnormal power outage has occurred in the M2M user equipment.

Table 1 to Table 3 may be applied to the IEEE 802.16.1b system advanced based on the IEEE 802.16m system. In particular, the signaling header disclosed in Table 1 to Table 3 represents an AMS battery report header that includes the involuntary power outage indicator. In this case, the involuntary power outage indicator may be included in a new signaling header, which includes abnormal power down, as well as the existing header such as the AMS battery report signaling header. For example, the signaling header may be referred to as an abnormal power down report signaling header or M2M abnormal power down report header. Also, the involuntary power outage indication field in Table 1 and Table 2 may be referred to as an emergency type field.

The following Table 4 illustrates an example of an abnormal power down signaling header that may be used at the step S440.

TABLE 4

| Syntax | Size (bits) | Contents |
|---|---|---|
| AMS Battery Report header ( ) { | | |
| FID | 4 | Flow Identifier. Set to 0b0010 |
| Type | 5 | MAC signaling header type = 0b01001 |
| Length | 3 | Indicates the length of the signaling header in bytes. |
| STID | 12 | Indicates STID of the M2M device that transmits this M2M abnormal power down report signaling header. |
| STID_Valid_Offset | 3 | Indicates STID_Valid_Offset of the M2M device that sends this M2M abnormal power down report signaling header. If the assigned STID is not shared with other M2M devices, M2M device shall set this field to zero. |

TABLE 4-continued

| Syntax | Size (bits) | Contents |
|---|---|---|
| Emergency Type | 1 | 0b0: power outage0b1: Reserved |
| Authentication code | 20 | |
| } | | |

Referring to Table 4, the M2M abnormal power down indication header may include a flow identifier (FID) field, length field indicating a length of the signaling header, a station identifier field indicating M2M device that transmits the M2M abnormal power down report header, a STID Valid Offset field indicating STID valid offset for the M2M device that transmits the M2M abnormal power down report header, an authentication code field, and an emergency type field indicating whether abnormal power down has occurred.

In other words, if the abnormal power outage event occurs in the M2M device, the M2M device may report the abnormal power outage event to the base station by transmitting the M2M abnormal power down report header of which emergency type field is set to '0'.

The following Table 5 illustrates further still another example of a signaling header format that may be used at the step S440. At this time, a feedback header may be used as the signaling header.

TABLE 5

| Feedback type (binary value) | Feedback contents | Contents |
|---|---|---|
| 0000 | MIMO feedback type (3 bits) + feedback payload (6 bits) | CQI and MIMO feedback. The definition of MIMO feedback type (3 bits) and the corresponding feedback payload (6 bits) are the same as that defined in Table 396 and 8.4.11.4, 8.4.11.5, 8.4.11.6, 8.4.11.7, 8.4.11.8, 8.4.11.9, 8.4.11.10 for the enhanced fast-feedback channel. |
| ... | ... | ... |
| 1100 | CL MIMO type (2 bits) If (CL MIMO type == 0b00{Antenna grouping index (4 bits) + average CQI (5 bits)} Elseif (CL MIMO type == 0b01 {Number of streams (2 bits) + Antennas selection option index (3 bits) + average CQI (5 bits) of the selected antennas}Elseif (CL MIMO type == 0b10) {Codebook index for N best AMC bands (N * 6 bits) + 2 bits differential CQI per band for the N best bands(N * 2 bits)} | Closed-loop MIMO feedback CL MIMOtype: 0b00: antenna grouping0b01: antenna selection0b10: codebook0b11: indication of transition fromclosed-loop MIMO to open-loop MIMO . . . 0b1: Indicating the involuntary power outage |
| 1101 | Indicator for requesting the involuntary power outage (1 bit) | |
| 1110-1111 | Reserved for future use | |

Referring to Table 5, if a feedback type is set to '0000', the feedback header may include a MIMO feedback type field and a feedback payload.

If the feedback type is set to '1100', the feedback header may include a closed loop (CL) MIMO feedback type field. At this time, if the CL MIMO feedback type field is set to 0b00, the feedback header may include an antenna grouping index field and an average CQI field. If the CL MIMO feedback type field is set to 0b01, the feedback header may include a stream number field indicating the number of streams, an antenna selection option index field, and an average CQI field indicating average CQI of a selected antenna. If the CL MIMO feedback type field is set to 0b10, the feedback header may include a codebook index field for N best AMC bands, and a field indicating a difference value per band for the N best AMC bands.

If the feedback type is set to '1101', the feedback header may include a power outage indicator field indicating an abnormal power outage event.

Table 5 may be applied to the IEEE 802.16p system advanced based on the IEEE 802.16e system. In particular, the signaling header disclosed in Table 5 may be referred to as M2M abnormal power down report header. Also, the abnormal power outage indicator field in Table 5 may be referred to as an emergency type field.

4. Power Outage Report Header

Hereinafter, for power outage report or abnormal power down report, methods for performing abnormal power down report by using the existing signaling header in the IEEE 802.16e system will be suggested. In other words, considering compatibility with the existing system, methods for performing abnormal power outage report by using the existing field within the range that a structure of the existing MAC header is little changed will be suggested.

Figure 5:
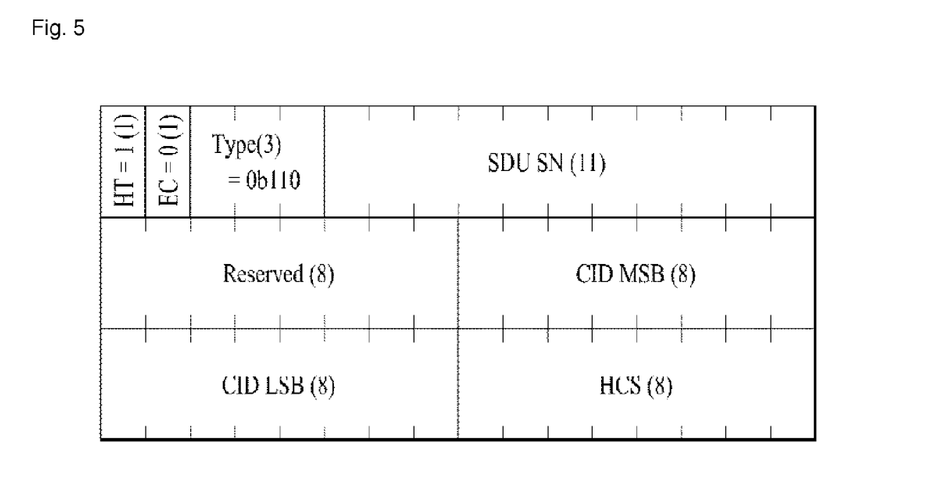
FIG. 5 is a diagram illustrating an example of a sequence number report header.

FIG. 5 is a diagram illustrating an example of a sequence number report header.

Referring to FIG. 5, the sequence number (SN) report header may include a header type (HT) field indicating a type of the header, an encryption control (EC) field indicating whether encryption of a payload has been performed, a sequence number field indicating a sequence number of a service data unit (SDU), a connection identifier (CID) field identifying basic connection for transmission of the SN report header, and a header check sequence (HCS) field for error control. At this time, the SDU SN field represents MAC SDU sequence number for activated connection of next ARQ BSN or SN feedback.

The SN report header is a signaling header included in MAC signaling header type I. The M2M device may report abnormal power outage by using the SN report header when the abnormal power outage event occurs. In other words, the M2M device may perform abnormal power outage report by using some of a reserved field of the SN report header of FIG. 5.

Figure 6:
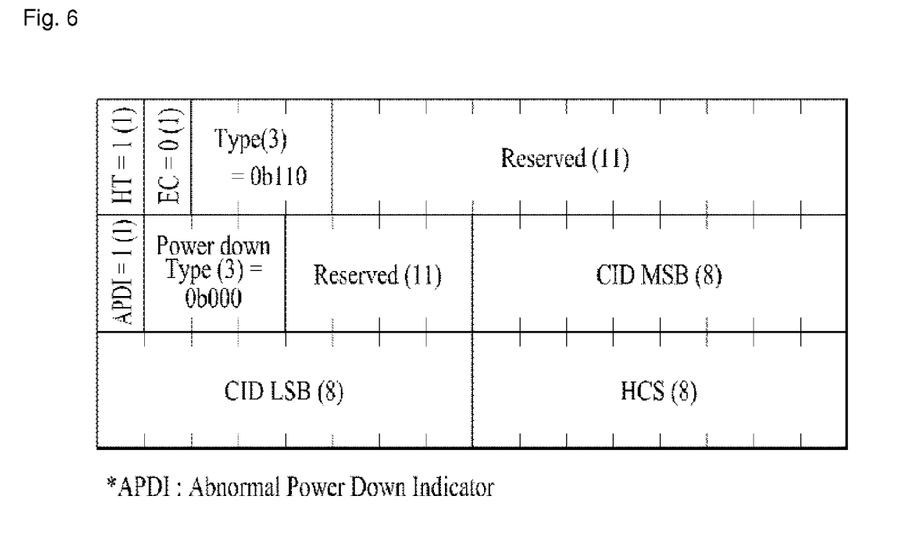
FIG. 6 is a diagram illustrating an example of an abnormal power down report header format in accordance with the embodiment of the present invention.

FIG. 6 is a diagram illustrating an example of an abnormal power down report header format in accordance with the embodiment of the present invention.

Basic structure of FIG. 6 is the same as that of FIG. 5. Accordingly, description of fields included in FIG. 6 will be understood from the description of FIG. 5. However, 4 bits of the reserved field of FIG. 6 are used for abnormal power outage report, and the SDU SN field is used as the reserved field. In other words, in FIG. 6, the abnormal power down indicator (APDI) field of 1 bit indicating whether abnormal power outage has occurred and the power down type field of 3 bits indicating a power down type may be used for abnormal power outage report.

For example, in the SN report header format transmitted from the M2M device, if the HT field is set to '1', the EC field is set to '0', the type of the signaling header is set to '0b110' and the APDI field is set to '1', the base station determines that the corresponding signaling header indicates the abnormal power down event.

In other words, the base station determines that the abnormal power down event (that is, abnormal power outage event) has occurred in the M2M device, and checks the type of the corresponding power down. Afterwards, the M2M device sets the power down type field to indicate the power down type, and sets the APDI field to '1' to indicate the abnormal power down event and transmits the set value to the base station.

In FIG. 6, in addition to the power down type, other information related to power down may be included in the abnormal power down report header. For example, one of values of the power down type may represent a power outage event (or abnormal power outage event). Also, in addition to the APDI field, a specific value (for example, 0b111) of the power down type may mean that the corresponding signaling header indicates abnormal power down.

Figure 7:
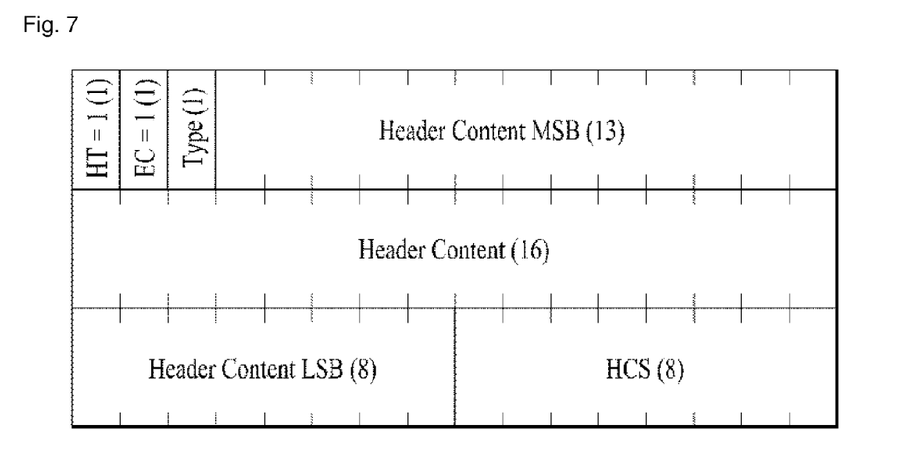
FIG. 7 is a diagram illustrating one of MAC signaling header type II formats in accordance with the embodiment of the present invention.

FIG. 7 is a diagram illustrating one of MAC signaling header type II formats in accordance with the embodiment of the present invention.

Referring to FIG. 7, the MAC signaling header type II may include an HT field of 1 bit, an EC field of 1 bit, a header contents field of 27 bits, and an HCS field of 8 bits. The MAC signaling header type II is used only in case of uplink specific operation. In this case, in addition to the header, no payload is included in the MAC PDU.

The M2M device may report abnormal power outage by using the MAC signaling header type II when the abnormal power outage event occurs. In other words, the M2M device may perform abnormal power outage report by using some of the header contents field of the MAC signaling header type II of FIG. 7.

Figure 8:
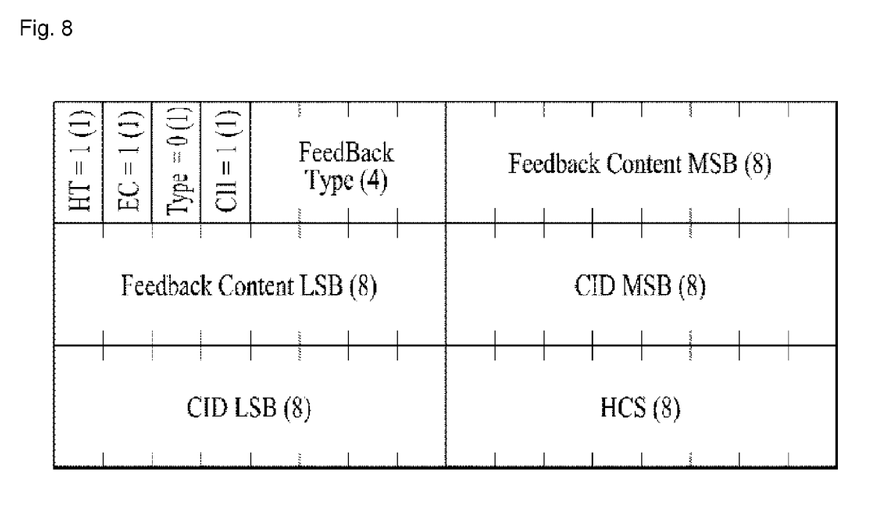
FIG. 8 is a diagram illustrating one of feedback headers in accordance with the embodiment of the present invention.

FIG. 8 is a diagram illustrating one of feedback headers in accordance with the embodiment of the present invention.

The feedback header of FIG. 8 includes an HT field of 1 bit, an EC field of 1 bit, a type field of 1 bit, a CII field of 1 bit, a feedback type field of 4 bits, a feedback contents field of 16 bits, a CID field of 16 bits, and an HCS field of 8 bits.

At this time, if the HT field is set to '1', the EC field is set to '0' and the CII field is set to '1', the feedback header represents the feedback header that includes the CID field.

The feedback header has information of the feedback contents field, which is variable depending on the feedback type. In the current IEEE 802.16e standard, all the feedback type fields (for example, 0b0000-0b1111) are already set for their respective purpose of uses.

In the embodiments of the present invention, one of the feedback headers which are previously set may be used for abnormal power outage report. For example, if the feedback type is set to '0b0001' in the existing IEEE 802.16e system, feedback contents have a size of 5 bits and represent downlink average CINR. At this time, information included in the 16 bit-feedback contents field of the feedback header is aligned in the order of the least significant bit (LSB), and the other reserved bits are set to 0. In other words, if the feedback type is set to '0b0001', the DL average CINR value is inserted to the LSB of the feedback contents, and the other 11 bits are set to 0.

In FIG. 8, the case where the feedback type is set to '0b0001' may be used to report the abnormal power outage event. In other words, the M2M device may set the feedback type to '0b0001' and may include information on the abnormal power outage event instead of DL average CINR value in the feedback contents. At this time, 1 bit of the most significant bits (MSB) of the feedback contents may be used as the abnormal power down indicator, and 3 bits may be used to represent abnormal power down information (for example, power down type).

Alternatively, the M2M device may set the feedback type to '0b0001' to represent feedback information on an abnormal power outage event, and may include 3-bit information on an abnormal power outage event in the feedback contents.

The following Table 6 illustrates an example of information included in the feedback contents in accordance with the feedback type.

TABLE 6

| Feedback type (binary value) | Feedback contents | Contents |
| --- | --- | --- |
| 0000 | MIMO feedback type (3 bits) + feedback payload (6 bits) | CQI and MIMO feedback. The definition of MIMO feedback type (3 bits) and the corresponding feedback payload (6 bits) are the same as that defined in Table 396 and 8.4.11.4, 8.4.11.5, 8.4.11.6, 8.4.11.7, 8.4.11.8, 8.4.11.9, 8.4.11.10 for the enhanced fast-feedback channel. |
| 0001 | Either DL average CINR (5 bits) orMSB 1 bit (Abnormal power down indicator = 0b1) & Abnormal power down information (power down type (3 bits) + other information (TBD)) orAbnormal power | DL average CINR of the serving or anchor BS (for the case of FBSS), with 5-bit payload encoding as defined in 8.4.5.4.11. If the MSB of Feedback contents is set to 1, instead of DL average CINR (or together with DL average CINR), abnormal power down |

TABLE 6-continued

| Feedback type (binary value) | Feedback contents | Contents |
|---|---|---|
| | down information (power down type (3 bits) + other information (TBD)) | information is included. Abnormal power down information is aligned with the LSB. Power down type (3 bits):- 0b000: Power outage or involuntary power outage- 0b001~0b111: reservedAlso, instead of adding APDI, a corresponding signaling header may mean that a specific value (for example, 0b111) of a power down type indicates abnormal power down. |
| ... | ... | ... |

Table 6 illustrates information on an abnormal power outage event, which is included in the feedback contents in accordance with the aforementioned feedback type.

The headers disclosed in FIG. 5 to FIG. 8 may be used as signaling headers for representing the abnormal power outage event at the step S440 of FIG. 4.

Figure 9:
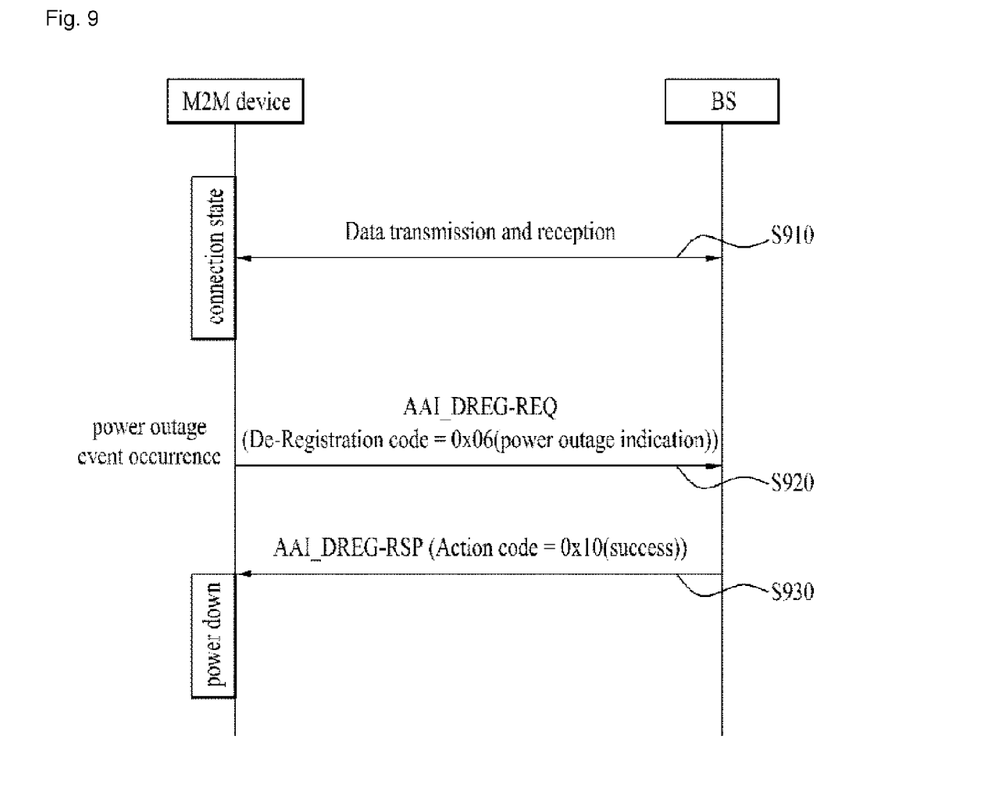
FIG. 9 is a diagram illustrating one of methods for reporting an abnormal power outage event in a deregistration process in accordance with the embodiment of the present invention.

FIG. 9 is a diagram illustrating one of methods for reporting an abnormal power outage event in a deregistration process in accordance with the embodiment of the present invention.

Referring to FIG. 9, the M2M device and the base station may transmit and receive data to and from each other at a connected state (S910).

Afterwards, as a power outage event occurs, the M2M device may recognize the abnormal power outage event. Accordingly, the M2M device may transmit a deregistration request message to the base station to notify the base station of the abnormal power outage event (S920).

The following Table 7 illustrates an example of a deregistration request code included in the deregistration request message.

TABLE 7

| Field | Size | Contents |
|---|---|---|
| Deregistration_Request_Code | 3 | Used to indicate the purpose of this message 0x00: AMS deregistration request from ABS and network. 0x01: request for AMS deregistration from S-ABS and initiation of AMS idle mode. 0x02: response for the unsolicited AAI-DREG-RSP message with action code 0x05 by the ABS. 0x03: reject for the unsolicited AAI-DREG-RSP message with action code 0x05 by the ABS. This code is applicable only when an AMS has a pending UL data to transmit. 0x04: request for AMS deregistration from S-ABS to enter DCR mode 0x05: response for the unsolicited AAI-DREG-RSP message with action code 0x00, 0x01, 0x02 or 0x030x06: Request for M2M device de-registration due to involuntary power outage0x07: reserved ... |

Referring to Table 7, the deregistration request code 0x00 represents a deregistration request from the base station and the network, 0x01 represents request for release and idle mode entry from the serving base station, 0x02 represents a response to an unsolicited deregistration response message, 0x03 represents rejection for the unsolicited deregistration release response message requesting idle mode entry, 0x04 represents request for deregistration from the serving base station to enter DCR mode, and 0x05 represents a response to the unsolicited deregistration request message set to 0x00, 0x01, 0x02, or 0x03. At this time, in the embodiment of the present invention, the M2M device may set to the deregistration request code to 0x06 to represent that the corresponding deregistration request message requests deregistration due to abnormal power down.

Referring to FIG. 9 again, if the power outage event occurs, the M2M device may set the deregistration request code to 0x06 at the step S920 to represent that the abnormal power outage event has occurred.

If the deregistration request message of which deregistration request code is set to 0x06 is received, the base station may transmit the deregistration response message to grant a power down operation (S930).

The following Table 8 illustrates an example of action codes included in the deregistration response message.

TABLE 8

| Field | Size | Contents |
|---|---|---|
| Action Code | 4 | Used to indicate the purpose of this message. 0x00: AMS shall immediately terminate service with the ABS and should attempt network entry at another ABS. 0x09: This option is valid only in response to an AAI-DREG-REQ message with De-Registration Request Code 0x04 to reject retention of the AMS's connection information. 0x10: This option is valid only in response to an AAI-DREG-REQ message with De-Registration Request Code 0x06 to allow the power down operation0x11-0x15: reserved ... |

Referring to Table 8, the action code of 0x00 represents that the M2M device immediately terminates service reception from the base station and should attempt a network entry process with another base station. The action code of 0x09 is a response to the deregistration request message of which deregistration request code is set to 0x04, and represents rejection of retention of connection information of the M2M device. The action code of 0x10 is a response to the deregistration request message of which deregistration code is set to 0x06 and represents grant of the power down operation.

Referring to FIG. 9 again, the base station may grant the power down operation by transmitting the deregistration response message of which action code is set to 0x10 to the M2M device at the step S930. The M2M Device that has received the deregistration response message of which action code is set to 0x10 immediately makes the power down.

The following Table 9 illustrates another example of the deregistration request code described in Table 7. The deregistration request code of Table 9 considers compatibility with the deregistration request message of the existing IEEE 802.16e system, and relates to a method for reusing the existing deregistration request code.

TABLE 9

| Field | Size | Contents |
|---|---|---|
| Deregistration_Request_Code | 3 | Used to indicate the purpose of this message 0x00: SS deregistration request from BS and network. 0x01: request for MS deregistration from serving base station and initiation of MS idle mode. 0x02: response for the unsolicited deregistration initiated by the BS. 0x03: reject for the unsolicited DREG-CMD message with action code 0x05 (idle mode request) by the BS. This code is applicable only when a MS has a pending UL data to transmit. 0x04: Request for M2M device de-registration due to involuntary power outage 0x05-0xFF: reserved . . . |

Referring to Table 9, the deregistration request code 0x00 represents a request for deregistration from the base station and the network, 0x01 represents a request for release and idle mode entry from the serving base station, 0x02 represents a response for an unsolicited deregistration response message, and 0x03 represents a rejection for the unsolicited deregistration response message requesting idle mode entry.

Also, the deregistration request code set to 0x04 may represent that the deregistration request message requests deregistration due to abnormal power down. In other words, the M2M device may report to the base station that the abnormal power outage event has occurred, by using the deregistration request code of 0x04.

The following Table 10 illustrates another example of the action codes included in the deregistration response message described in Table 8. The action codes of Table 10 considers compatibility with the deregistration response message of the existing IEEE 802.16e system, and relates to a method for reusing the existing deregistration response code.

TABLE 10

| Action code | Action Contents |
|---|---|
| 00 | SS shall immediately terminate service with the BS and should attempt network entry at another BS. |
| 01 | SS shall listen to the current BS but shall not transmit until a RES-CMD message or DREG-CMD message with action code 02 or 03 is received. |

TABLE 10-continued

| Action code | Action Contents |
|---|---|
| 06 | This option is valid only in response to a DREG-REQ message with De-Registration Request Code = 0x01. The behavior of MS to this action code is described in 6.3.23.1. |
| 07 | This option is valid only in response to a DREG-REQ message with De-Registration Request Code = 0x04. |
| 08-0xFF | Reserved |

Referring to Table 10, the action code of 0x00 represents that the M2M device immediately terminates service reception from the base station and should attempt a network entry process with another base station. The action code of 0x06 is a response to the deregistration request message of which deregistration request code is set to 0x01. The action code of 0x07 is a response to the deregistration request message of which deregistration code is set to 0x04 and represents grant of the power down operation.

In other words, if the M2M device transmits the deregistration request message, which includes the deregistration request code set to 0x04 in Table 9, to the base station, the base station may recognize that the abnormal power outage event has occurred in the M2M device. Accordingly, the base station may indicate that the M2M device should perform the power down operation by transmitting the deregistration response message of which action code is set to 0x07 to the M2M device in response to the deregistration request message.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention may be applied to various wireless access systems. Examples of the various wireless access systems include 3GPP (3rd Generation Partnership Project) system, 3GPP2 system, and/or IEEE 802.xx (Institute of Electrical and Electronic Engineers 802) system. The embodiments of the present invention may be applied all the technical fields based on the various wireless access systems as well as the various wireless access systems.

The invention claimed is:

1. A method for reporting an abnormal power outage event in a wireless access system that supports M2M (Machine to Machine) communication environment, the method performed by an M2M device and comprising:
   detecting the abnormal power outage event at the M2M device in a connected state;
   transmitting, to a base station, a bandwidth request preamble sequence to request a bandwidth for transmitting a signaling header, wherein the signaling header is used to report the abnormal power outage event;
   receiving resource allocation information indicating the bandwidth in response to the bandwidth request preamble sequence; and
   transmitting the signaling header to the base station via the bandwidth, the signaling header including a power outage indicator for reporting the abnormal power outage event,
   wherein a size of the power outage indicator is 1 bit and the bit is set to '0' to indicate the abnormal power outage event.

2. The method according to claim 1, wherein the signaling header is an M2M abnormal power down report header.

3. The method according to claim 1, further comprising:
   receiving a response message in response to the signaling header, the response message indicating that a power down operation is to be performed; and
   performing the power down operation after receiving the response message.

4. A method for reporting an abnormal power outage event in a wireless access system that supports M2M (Machine to Machine) communication environment, the method performed by a base station and comprising:
   receiving, from a M2M device, a bandwidth request preamble sequence requesting a bandwidth for transmitting a signaling header, wherein the signaling header is used to report the abnormal power outage event;
   transmitting resource allocation information indicating the bandwidth in response to the bandwidth request preamble sequence; and
   receiving a signaling header from the M2M device via the bandwidth, the signaling header including a power outage indicator for reporting the abnormal power outage event,
   wherein a size of the power outage indicator is 1 bit and the bit is set to '0' to indicate the abnormal power outage event.

5. The method according to claim 4, further comprising:
   transmitting a response message in response to the signaling header, the response message indicating that a power down operation is to be performed.

6. The method according to claim 5, wherein the response message is an acknowledgement (ACK) message or M2M abnormal power down confirmation header.

7. The method according to claim 4, wherein the signaling header is an M2M abnormal power down report header.

8. An M2M device for reporting an abnormal power outage event in a wireless access system that supports M2M (Machine to Machine) communication environment, the M2M device comprising:
   a transmitter;
   a receiver; and
   a processor controlling detecting and reporting operations of the abnormal power outage event,
   wherein the M2M device is configured to:
   detect the abnormal power outage event in a connected state through the processor,
   transmit, to a base station by controlling the transmitter, a bandwidth request preamble sequence to request a bandwidth for transmitting a signaling header, wherein the signaling header is used to report the abnormal power outage event;
   receive resource allocation information indicating the bandwidth in response to the bandwidth request preamble sequence by controlling the receiver; and
   transmit a signaling header to the base station through the bandwidth by controlling the transmitter, the signaling header including a power outage indicator for reporting the abnormal power outage event,
   wherein a size of the power outage indicator is 1 bit and the bit is set to '0' to indicate the abnormal power outage event.

9. The M2M device according to claim 8, wherein the signaling header is an M2M abnormal power down report header.

10. The M2M device according to claim 8, wherein the M2M device further configured to receive a response message in response to the signaling header, wherein the response message indicates that a power down operation is to be performed, and perform the power down operation after receiving the response message.

* * * * *